United States Patent [19]

Douchet

[11] Patent Number: 5,706,865
[45] Date of Patent: Jan. 13, 1998

[54] PIPE FOR HIGH PRESSURE FLUID

[75] Inventor: Jean-Claude Douchet, Le Plessis-Brion, France

[73] Assignee: Nobel Plastiques, Nanterre, France

[21] Appl. No.: 633,736
[22] PCT Filed: Nov. 7, 1994
[86] PCT No.: PCT/FR94/01287
§ 371 Date: Apr. 22, 1996
§ 102(e) Date: Apr. 22, 1996
[87] PCT Pub. No.: WO95/13494
PCT Pub. Date: May 18, 1995

[30] Foreign Application Priority Data

Nov. 9, 1993 [FR] France .................. 93 13360

[51] Int. Cl.⁶ .................................. F16L 11/08
[52] U.S. Cl. .................. 138/125; 138/126; 138/137; 138/141
[58] Field of Search .................. 138/137, 123–126, 138/140, 141, DIG. 1, DIG. 7; 428/36.1, 36.2

[56] References Cited

U.S. PATENT DOCUMENTS

| | | |
|---|---|---|
| 4,444,700 | 4/1984 | Fondren . |
| 4,699,178 | 10/1987 | Washkewicz et al. ............ 138/125 |
| 4,842,024 | 6/1989 | Palinchak . |
| 4,907,625 | 3/1990 | Ito et al. . |
| 5,284,184 | 2/1994 | Noone et al. ............ 138/125 X |
| 5,488,974 | 2/1996 | Shiota et al. ............ 138/126 X |

FOREIGN PATENT DOCUMENTS

| | | |
|---|---|---|
| 0294181 | 12/1988 | European Pat. Off. . |
| 0461966 | 12/1991 | European Pat. Off. . |
| 3439312 | 5/1985 | Germany . |
| 2117482 | 10/1983 | United Kingdom . |

OTHER PUBLICATIONS

Database WPI Week 9115, Derwent Publications Ltd., London GB ; AN 91–107547 & JP,A,3 051 596 (Nitta KK) 5 mars 1991.

Primary Examiner—Patrick F. Brinson
Attorney, Agent, or Firm—Griffin, Butler, Whisenhunt & Kurtossy

[57] ABSTRACT

A pipe comprising a multilayer inner core (1) whose outer layer is made of polyamide or of EVOH to provide an effective barrier function, and outer reinforcement that withstands pressure. The outer reinforcement comprises at least one filamentary reinforcing structure (4) placed around the core (1), a covering outer layer (7), and at least one bonding agent (3, 5) for bonding the reinforcing structure (4) to the inner core (1), the agent being selected from polyurethane or polyamide hot melt adhesives and thermosetting polyesters.

14 Claims, 1 Drawing Sheet

PIPE FOR HIGH PRESSURE FLUID

The present invention relates to a pipe for high pressure fluid, and more particularly for conveying a fluid that changes state, such as a refrigerator fluid.

BACKGROUND OF THE INVENTION

Present pipes for refrigerator fluid such as Freon (in its most recent version known as R134a) are made of multilayer elastomer comprising reinforcement embedded in the rubber and secured to the various layers when vulcanization takes place.

Some such pipes include an inside lining formed by a layer of plastics material such as a polyamide in order to increase the impermeability of the wall relative to the refrigerator fluid being conveyed, whether in the liquid state or in the gas state.

A major drawback of such pipes lies in their weight, their bulk, and their lack of flexibility.

SUMMARY OF THE INVENTION

The present invention seeks to remedy those drawbacks by separating the elements designed to provide a barrier against the refrigerator fluid from the elements for withstanding pressure. The invention thus proposes a pipe having an inner core which performs a multilayer barrier function and an outer portion for withstanding pressure.

The nature of the inner core and particularly the nature of the material forming its outer layer constitutes a constraint on how the outer portion of the pipe can be made. In general, said outer surface is a polyamide to which it is practically impossible to bond a filamentary reinforcing structure. After numerous tests, the invention proposes a specific bond between said inner structure and the filamentary reinforcement which, in addition to being of high quality, and in particular under high temperature and high pressure, also enables the pipe to be made with a relatively thin wall, thereby conferring great flexibility thereto.

To this end, the invention therefore provides a pipe comprising an inner core whose outer structure is made of polyamide that provides an effective barrier function, and outer reinforcement that withstands pressure, the reinforcement comprising a filamentary reinforcing structure such as a weave, a braid, or a knit that is placed around the core, an outer covering layer of thermoplastic rubber based on polyolefin or on polyprobutyl, and at least one agent for ensuring bonding at least between said filamentary structure and the inner core. Given the low degree of compatibility between the outside surface of the core and the nature of the threads used (aromatic polyamides or polyesters), numerous tests were performed to discover that the effective bonding agent had to be either a hot melt polyurethane, or a hot melt polyamide, or else a thermosetting polyester.

Preferably the inner core includes, three layers of polyamide, with the outer layer made from a polyamide elastomer, e.g. a copolyamide elastomer of the type ELY 60 or ELX23NZ, products developed by EMS CHEMIE AG of Zurich, Switzerland. The core is made by coextrusion and constitutes an advantageous solution to the problem of conveying a refrigerator fluid in a flexible pipe while retaining excellent barrier and chemical resistance qualities. It may also incorporate a coextruded layer of EVOH, either between two layers of polyamide or outside said layers.

In a first method, the outer reinforcement is made by extruding hot melt polyamide or polyurethane or thermosetting polyester onto the core and then installing the filamentary structure (wrapped around, weave, braid, or knit made from aromatic polyamide or polyester fibers) and then extruding a second layer of hot melt polyamide or polyurethane or thermosetting polyester thereon preferably with coextrusion of maleic acid to reinforce the bonding with the outer layer of thermoplastic rubber.

In a variant of this method, it suffices to deposit only one layer of bonding agent between the core and the filamentary structure. In another variant, the bonding agent may be placed between the filamentary structure and either the outer layer or the core, providing the viscosity of said bonding agent enables it to be sweated through the filamentary structure to reach the core or the outer layer.

When the filamentary structure is made of tapes of threads wrapped around, it is possible to apply a single layer of bonding agent between two sheets of threads that are wound successively and in opposite directions onto the core.

If a stiffer pipe is required, the thermoplastic rubber may be replaced by a layer of polyamide; under such circumstances, maleic acid is not essential.

In another variant embodiment, a filamentary structure based on fibers that have been preimpregnated with hot melt polyamide or polyurethane or with thermosetting polyester is installed around the central core. The quality of the bonding achieved between the core, the threads, and the outer layer is less good, but the cost is lower, and the bonding may be adequate in certain applications.

Other characteristics and advantages will appear from the following description of an embodiment of the invention given by way of indication.

BRIEF DESCRIPTION OF THE DRAWINGS

Reference is made to the accompanying drawing, in which.

DESCRIPTION OF PREFERRED EMBODIMENTS

Figure 1:
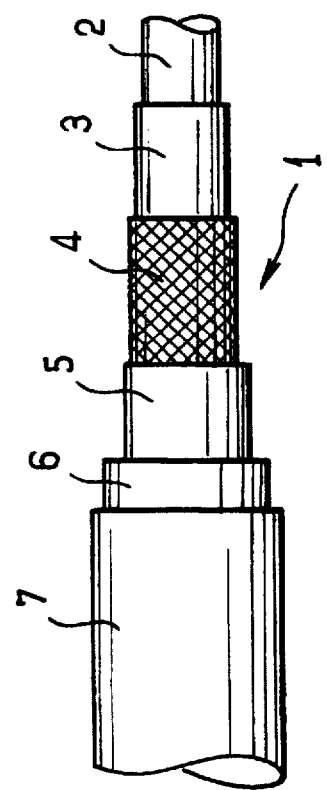
FIG. 1 is a view showing the various layers making up a first embodiment of a pipe of the invention.

The tube 1 shown in FIG. 1 comprises an inner core 2 made up essentially from a plurality of polyamide layers, e.g. three such layers, namely an inner layer of polyamide 12 that is about 0.35 mm thick, an intermediate layer of polyamide elastomer that is about 0.2 mm thick, and an outer layer of polyamide 6 that is 0.45 mm thick, the core being formed by coextrusion to constitute a tubular wall having a thickness of about 1 mm.

Thereafter, the pipe of the invention comprises a layer 3 of hot melt polyamide, or of hot melt polyurethane, or of thermosetting polyester extruded onto the inner core, with a cover, a braid, or a knit of fibers 4 being put into place thereon, where the fibers may be made of polyester or of aromatic polyamide such as Kevlar (registered trademark).

The layer 5 is identical to the layer 3, i.e. it is a layer of hot melt polyamide or polyurethane or of thermosetting polyester covered by coextrusion in a layer of maleic acid 6 which enhances bonding of the intermediate layers to the outer layer 7 made of a thermoplastic rubber based on polyolefin or on polyprobutyl. The thickness of the layers 3 and 5 is about five-hundredths of a millimeter to one-tenth of a millimeter. The thickness of the layer 7 lies in the range 1 mm to 2 mm. The layer of maleic acid is a few hundredths of a millimeter thick.

The advantage of using bonding agents such as hot melt polyurethane or polyamide or thermosetting polyester should be observed: they provide good strength and good performance at temperatures (150° C. to 200° C.) much greater than those of solvent-based adhesives.

Figure 2:
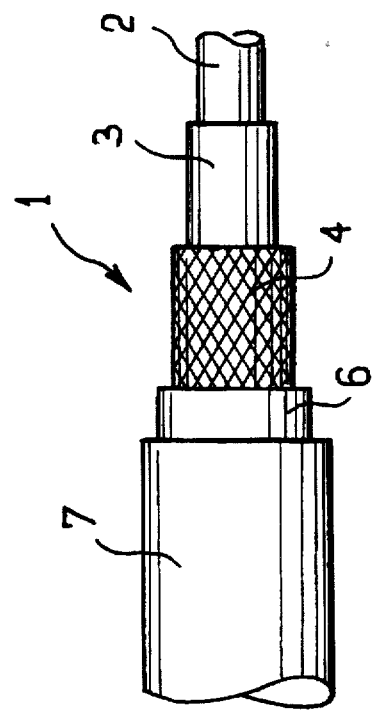

FIG. 2 shows a variant embodiment of a pipe of the invention. The layer 5 of bonding agent is omitted, so there is only one layer 3. In some cases, the viscosity of the bonding agent is chosen so as to enable it to pass through the gaps in the filamentary structure 4 so as to reach the outer layer 7, if necessary via the layer of maleic acid 6. More precisely, the composition is given below of a pipe made with a single layer 3 and with tight reinforcement 4 that did not allow the bonding agent of the invention to pass through. The composition gave satisfaction in that it retained its mechanical and barrier qualities under a pressure of 35 bars and a temperature of 135° C. Thus, the multilayer inner core comprised an outer layer of modified polyamide ELX23NZ manufactured by the Swiss firm EMS CHEMIE AG, the bonding agent between the inner core and the reinforcement being a cross-linkable polyurethane adhesive reference Perfect 254 or 413 from NATIONAL STARK, the reinforcing layer was made of 1440 dtex polyester threads of DIOLEN 855T from AKZO, the adhesive agent between said reinforcement and the outer layer of thermoplastic elastomer was a maleic acid product having the reference PO 1015 F from EXXON, and the thermoplastic elastomer was of the SANTOPREN type, both EPDM polypropylene (101-64) from AES and butyl polypropylene from DSM being suitable. The adhesive was cross-linked in known manner using hot water.

Figure 3:
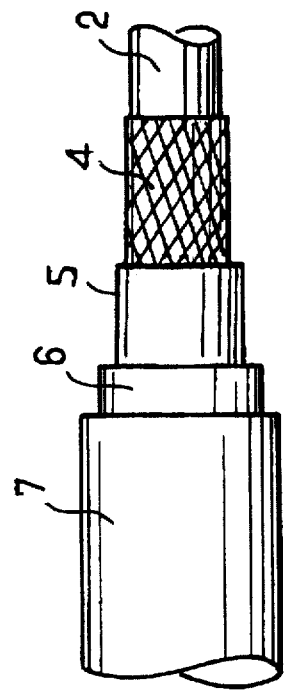
FIGS. 2, 3, and 4 show variants of the FIG. 1 embodiment.

FIG. 3 shows a variant way of making a pipe of the invention. The layer 3 of bonding agent is omitted leaving only the layer 5 which is of a viscosity that is determined so as to enable it to pass through the gaps in the filamentary structure 4 so as to reach the inner core 2.

Figure 4:
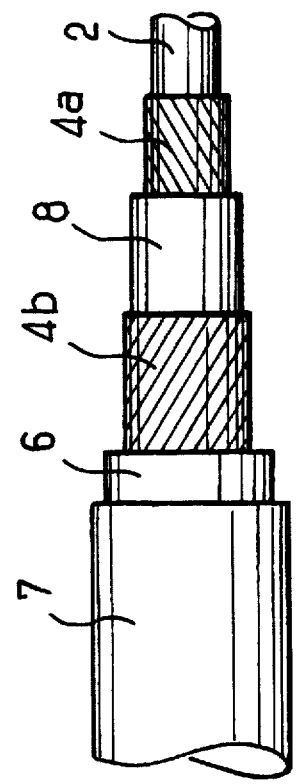

Finally, FIG. 4 shows a filamentary structure made by winding two sheets of threads 4a and 4b consecutively, with the sheets being wound in opposite directions around the axis of the core. In this case, the bonding agent may be restricted to a single layer 8 that is placed between the two sheets 4a and 4b constituting a weave, with the bonding agent sweating through at least to the core.

In a variant embodiment of the pipe, the layers 3 and 5 are omitted and the woven or braided textile reinforcement 4 is directly impregnated with the hot melt substances. Bonding is then naturally limited to the points of contact between the reinforcement 4 and the inner core 2 or the outer layer 7, with maleic acid 6 being added for this outer bonding.

In certain applications, it may be preferable to have an outer layer of polyamide, thereby imparting greater stiffness to the pipe, with maleic acid being unnecessary between the hot melt polyurethane (or polyamide) and the outer layer.

Finally, the structure of the inner core can be varied by adding a layer of EVOH by coextrusion, where EVOH is a substance known per se and known for its effectiveness as a barrier against certain components of gasoline. The EVOH layer may be placed outside the multilayer polyamide and the measures of the invention apply since it has the same difficulties of compatibility and bonding with a filamentary reinforcing structure and with a flexible outer layer of butylpolypropylene or thermoplastic rubber.

The invention makes it possible to obtain pipes that are light in weight and small in diameter, possessing good performance with respect to constituting a barrier and to withstanding pressure (35 bars) and temperature (135° C.).

I claim:

1. A pipe comprising an inner core whose outer surface is made of polyamide, and outer reinforcement that withstands pressure, wherein the outer reinforcement comprises at least one filamentary reinforcing structure placed around the inner core, a covering outer layer, and at least one bonding agent for bonding the reinforcing structure to the inner core, the bonding agent being selected from the group consisting of polyurethane, polyamide hot melt adhesives and thermosetting polyesters.

2. A pipe according to claim 1, wherein the bonding agent is a hot melt polyurethane.

3. A pipe according to claim 2, wherein said filamentary reinforcing structure is bonded to said covering outer layer by a second bonding agent including hot melt polyurethane.

4. A pipe according to claim 1, wherein the bonding agent is a hot melt polyamide.

5. A pipe according to claim 4 wherein said filamentary reinforcing structure is bonded to said covering outer layer by a second bonding agent including hot melt polyamide.

6. A pipe according to claim 3, wherein a layer of maleic acid is included between said second bonding agent and said covering outer layer.

7. A pipe according to claim 1, including a second bonding agent for bonding the filamentary structure to the covering outer layer which second bonding agent includes a layer of maleic acid.

8. A pipe comprising an inner core whose outer surface is made of EVOH, and outer reinforcement that withstands pressure, wherein the outer reinforcement comprises at least one filamentary reinforcing structure placed around the inner core, a covering outer layer, and at least one bonding agent for bonding the reinforcing structure to the inner core, the bonding agent being selected from the group consisting of polyurethane, polyamide hot melt adhesives and thermosetting polyesters.

9. A pipe according to claim 8, wherein the bonding agent is a hot melt polyurethane.

10. A pipe according to claim 9, wherein said filamentary reinforcing structure is bonded to said covering outer layer by a second bonding agent including hot melt polyurethane.

11. A pipe according to claim 8, wherein the bonding agent is a hot melt polyamide.

12. A pipe according to claim 11, wherein said filamentary reinforcing structure is bonded to said covering outer layer by a second bonding agent including hot melt polyamide.

13. A pipe according to claim 10, wherein a layer of maleic acid is included between said second bonding agent and said covering outer layer.

14. A pipe according to claim 8, including a second bonding agent for bonding the filamentary structure to the covering outer layer which second bonding agent includes a layer of maleic acid.

* * * * *